United States Patent
Hamada et al.

(10) Patent No.: US 6,914,414 B2
(45) Date of Patent: Jul. 5, 2005

(54) COOLING DEVICE FOR BATTERY PACK AND RECHARGEABLE BATTERY

(75) Inventors: Shinji Hamada, Toyohashi (JP); Takashi Asahina, Toyohashi (JP); Toyohiko Eto, Toyota (JP); Ko Watanabe, Nishikamo-gun (JP)

(73) Assignees: Matsushita Electric Industrial Co., Ltd., Osaka (JP); Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 10/442,241

(22) Filed: May 21, 2003

(65) Prior Publication Data

US 2004/0004461 A1 Jan. 8, 2004

(30) Foreign Application Priority Data

May 22, 2002 (JP) ........................................ 2002-148009

(51) Int. Cl.[7] .............................................. H01M 10/46
(52) U.S. Cl. ........................................ 320/107; 320/150
(58) Field of Search ................................ 320/104, 107, 320/116, 120, 126, 144, 150, 155; 429/62, 97, 98, 99, 100, 120

(56) References Cited

U.S. PATENT DOCUMENTS 6,218,807 B1 * 4/2001 Sakaue et al. .............. 320/107
6,342,773 B2 * 1/2002 Sakaue et al. .............. 320/107
6,448,741 B1 9/2002 Inui et al. .................... 320/107

FOREIGN PATENT DOCUMENTS

JP 2000-003734 1/2000
JP 2003142166 A * 5/2003 .......... H01M/10/50

OTHER PUBLICATIONS

English Language Abstract of JP 2000–003734.

* cited by examiner

Primary Examiner—Edward H. Tso
(74) Attorney, Agent, or Firm—Greenblum & Bernstein, P.L.C.

(57) ABSTRACT

In a battery pack including a plurality of prismatic rechargeable batteries arranged in parallel with ventilation spaces being provided therebetween, the battery pack is constituted so that cooling air is downwardly sent from above the battery pack through the ventilation spaces. In accordance with a temperature detected with a temperature detection sensor attached to the lower end of the rechargeable battery, a blower fan is controlled by a control section. Moreover, a sensor placement concave, which is separated from a space inside a battery case through a thin partition wall, is provided on a bottom wall of the battery case of the rechargeable battery. The temperature detection sensor is placed in the sensor placement concave so as to be pressed against the partition wall.

10 Claims, 6 Drawing Sheets

COOLING DEVICE FOR BATTERY PACK AND RECHARGEABLE BATTERY

The present disclosure relates to subject matter contained in priority Japanese Patent Application No. 2002-148009, filed on May 22, 2002, the contents of which is herein expressly incorporated by reference in its entirety.

BACKGROUND OF THE INVENTION

1. Field of the Invention

The present invention relates to a cooling device for a battery pack including a plurality of prismatic rechargeable batteries that are arranged in parallel and to such a rechargeable battery.

2. Description of Related Art

In a conventional battery pack, in order to prevent decrease in a battery output, charging/discharging efficiency, and battery service life due to the elevation of the battery temperature by heat generation that occurs along with charging/discharging, for example, a fan is provided to send cooling air between cells in the battery pack or between battery modules, each including a plurality of serially connected cells.

The above-mentioned structure will be described with reference to FIGS. 8 and 9. In FIG. 8, reference numeral 31 denotes a battery pack serving as a power source for electric vehicles including hybrid cars. In the battery pack 31, twenty to thirty rechargeable batteries 32 are arranged in parallel with ventilation spaces 34 being provided between the respective rechargeable batteries 32. The batteries 32 are interposed between a pair of end plates 35 that are provided on both ends of the rechargeable batteries 32 so as to be integrally fixed therebetween, thereby constituting the battery pack 31. As shown in FIG. 9, each of the rechargeable batteries 32 is constituted as a battery module that is formed by arranging a plurality of cells 33 in parallel in an integrated manner and internally connecting the cells 33 in series. Each of the cells 33 is constituted by housing an electrode plate group 33b and an electrolyte solution in a battery case 33a. Connection terminals 36 provided on both sides of the rechargeable batteries 32 are connected in series so as to obtain a predetermined output voltage of the battery pack 31.

An air path 38 is provided in a support frame 37 for supporting the battery pack 31, whereas an air exhausting path 39 is provided above the battery pack 31. Reference numeral 40 denotes an air duct for taking air inside a vehicle compartment so as to provide cooling air through the air path 38. A blower fan 41 is provided in the middle of the air duct 40. Reference numeral 42 denotes a reflux duct for refluxing the cooling air exhausted from the air exhausting path 39 into the vehicle compartment.

Temperature detection sensors 43 are attached to the upper ends of the battery case 33a of appropriate cells 33 included in each of the rechargeable batteries 32. Detection signals from the temperature detection sensors 43 are input to a temperature detection section 44 so as to detect a temperature of each of the rechargeable batteries 32. Temperature data of each of the rechargeable batteries 32 is input to a control section 45 which in turn obtains a mean temperature of the rechargeable batteries 32. The amount of cooling air created by the blower fan 41 is controlled in accordance with the obtained mean temperature.

The attachment structure of each of the temperature detection sensors 43 is as follows. As shown in FIG. 9, a temperature detection hole 46, which is sealed from inside of the battery case 33a and is open to the exterior, is provided on the upper end of an appropriate cell 33. The temperature detection sensor 43 is inserted into the temperature detection hole 46 to be attached through an adhesive or a resin, thermally fused, or fixed, thereby allowing the detection of a temperature inside the cell from the exterior of the cell.

The above-described cooling device for the battery pack employs an upflow system for upwardly blowing cooling air from below the battery pack 31. The cooling is controlled by detecting a temperature of the cell with the temperature detection sensor 43 provided on the upper end of the rechargeable battery 32. However, since heat generating portions such as the connection terminals 36 and joint portions 33c between the cells 33 concentrate in the upper part of the rechargeable battery 32, this upper part has a high temperature as compared with its lower part or the like. Consequently, the upflow system is disadvantageous in that cooling efficiency is impaired because a portion having a higher temperature is cooled with cooling air having the lowered cooling capacity and that a variation in temperature between the upper part and the lower part of the rechargeable battery 32 is increased.

What is worse, in the upflow system, the air duct 46 or the like is required to be provided in a largely devious manner so as to take the air inside a vehicle compartment and to send it as shown in FIG. 8. As a result, the cost is adversely increased, and the space cannot be reduced due to the provision of the air duct 40.

In a case where a downflow system for allowing cooling air to downwardly flow from above the battery pack 31, a temperature of a portion of the cell having the highest temperature cannot be detected because the temperature detection sensors 43 are attached on the upper end of the rechargeable battery 32, that is the most cooled portion.

SUMMARY OF THE INVENTION

In light of the above conventional problems, the present invention has an object of providing a cooling device for a battery pack and a rechargeable battery, which allow the battery pack to be efficiently and uniformly cooled while achieving the reduction in cost as well as in space, enabling the accurate control of a battery temperature.

According to the present invention, a cooling device for a battery pack including a plurality of prismatic rechargeable batteries arranged in parallel with a ventilation space provided therebetween, the cooling device includes: a blower device for downwardly sending cooling air from above the battery pack through the ventilation space; and a control device for controlling the blower device in accordance with a temperature detected by a temperature detection sensor attached to a lower end of the rechargeable battery.

According to such a structure, since cooling air is downwardly sent from above the battery pack through the ventilation space between the rechargeable batteries, an upper part of each of the rechargeable batteries where heat generating portions concentrate is first cooled to efficiently cool the battery pack as a whole as well as to restrain a variation in temperature between the upper part and a lower part of the rechargeable battery. Although the lower end of the rechargeable battery has the highest temperature as a result of cooling in a downflow system, since the temperature of the lower end of the rechargeable battery is detected by the temperature detection sensor to control the blower device, a temperature of the entire battery pack is regulated to be within an appropriate range so as to prevent a decrease in a battery output, charging/discharging efficiency, and battery service life. Furthermore, since the downflow system is employed, an air duct for cooling air is simplified in a case where air is taken from a vehicle compartment so as to be sent as cooling air, thereby reducing the cost and the space.

In a rechargeable battery according to the present invention, including an electricity generating element housed in a sealed prismatic battery case, a sensor placement concave is provided on a bottom wall of the battery case through a partition wall thinner than the bottom wall so as to be separated from a space within the battery case. The temperature detection sensor is provided in the sensor placement concave so as to be pressed against the partition wall. A temperature of the lower end of the rechargeable battery, which has the highest temperature in a case where the battery pack is cooled in a downflow system, is thereby detected. Moreover, since the temperature detection sensor is pressed against the thin partition wall, a temperature inside the battery case is detected with good accuracy and good response.

While novel features of the invention are set forth in the preceding, the invention, both as to organization and content, can be further understood and appreciated, along with other objects and features thereof, from the following detailed description and examples when taken in conjunction with the attached drawings.

BRIEF DESCRIPTION OF THE DRAWINGS

FIG. 4A is a perspective view viewed from above and FIG. 4B is a perspective view viewed from below;

DETAILED DESCRIPTION OF THE PREFERRED EMBODIMENTS

Hereinafter, an embodiment of a cooling device for a battery pack and a rechargeable battery constituting the battery pack according to the present invention will be described with reference to FIGS. 1 to 7.

Figure 1:
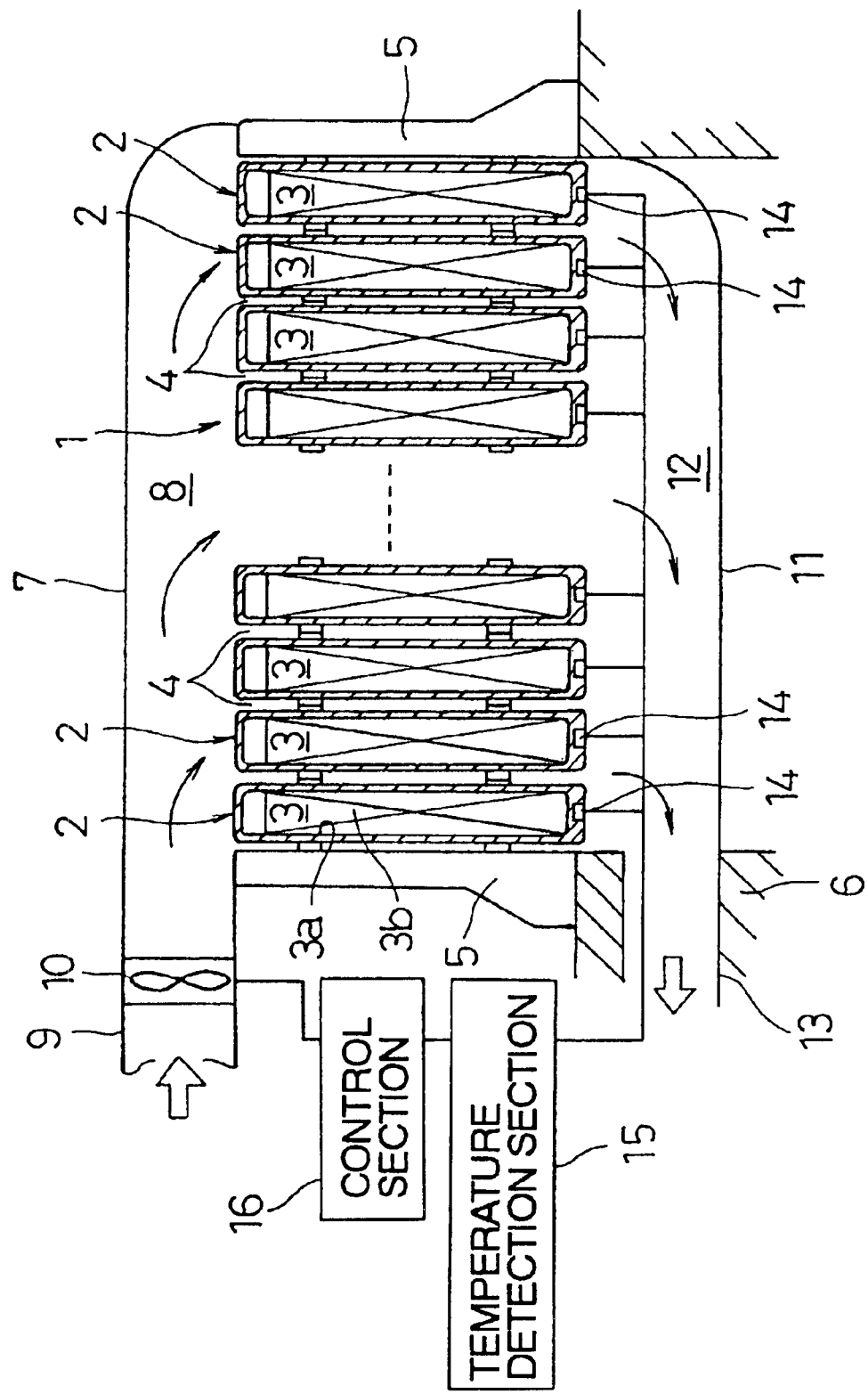
FIG. 1 is a schematic view showing the configuration of a cooling device for a battery pack according to an embodiment of the present invention.

In FIG. 1, reference numeral 1 denotes a battery pack serving as a power source for electric vehicles including hybrid cars. In the battery pack 1, twenty to thirty rechargeable batteries 2 are arranged in parallel with ventilation spaces 4 being provided between the respective rechargeable batteries 2. The rechargeable batteries 2 are interposed between a pair of end plates 5 provided on both, ends of the rechargeable batteries 2 so as to be integrally fixed therebetween, thereby constituting the battery pack 1.

Each of the rechargeable batteries 2 is constituted as a battery module that is formed by arranging a plurality of cells 3 in parallel in an integrated manner and internally connecting these cells in series. Each of the cells 3 is constituted by housing an electrode plate group 3b and an electrolyte solution in a battery case 3a. Connection terminals (not shown) provided in a protruding manner on both sides of each of the rechargeable batteries 2 are sequentially connected in series so as to obtain a predetermined output voltage of the battery pack 1. The battery pack 1 is supported by placing the end plates 5 on both ends and both ends of each of the rechargeable batteries 2 which are vertical to the paper plane onto a support frame 6 in a rectangular shape.

The upper face of the battery pack 1 is covered with a cover 7 with a space being provided therebetween. An air path 8 is formed between the upper face of the battery pack 1 and the cover 7. An air duct 9 for taking air inside a vehicle compartment to provide cooling air to the air path 8 is connected to one end of the air path 8. In the middle of the air duct 9, a blower fan 10 is provided. A bottom face cover 11 is provided for a portion of the under face of the battery pack 1 that is surrounded by the support frame 6, with a space being provided therebetween. An air exhausting path 12 is formed between the under face of the battery pack 1 and the bottom face cover 11. A reflux duct 13 for refluxing cooling air after cooling the battery pack 1 into the vehicle compartment is connected to one end of the air exhausting path 12.

A temperature detection sensor 14 is attached to a bottom wall of the battery case 3a of an appropriate cell 3 of each of the rechargeable batteries 2. A detection signal from the temperature detection sensor 14 is input to a temperature detection section 15 so as to detect a temperature of each of the rechargeable batteries 2. Temperature data of each of the rechargeable batteries 2 is input to a control section 16. The control section 16 in turn obtains a mean temperature of the rechargeable batteries 2. In accordance with the obtained mean temperature, the amount of cooling air produced by the blower fan 10 is controlled.

Figure 2:
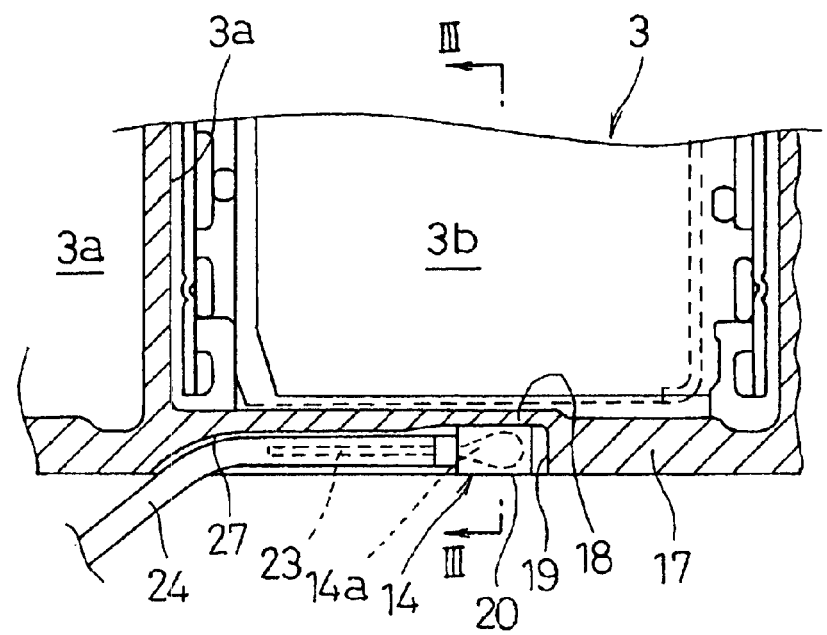
FIG. 2 is a detailed longitudinal sectional view of a portion where a temperature detection sensor is placed, according to the embodiment.
Figure 3:
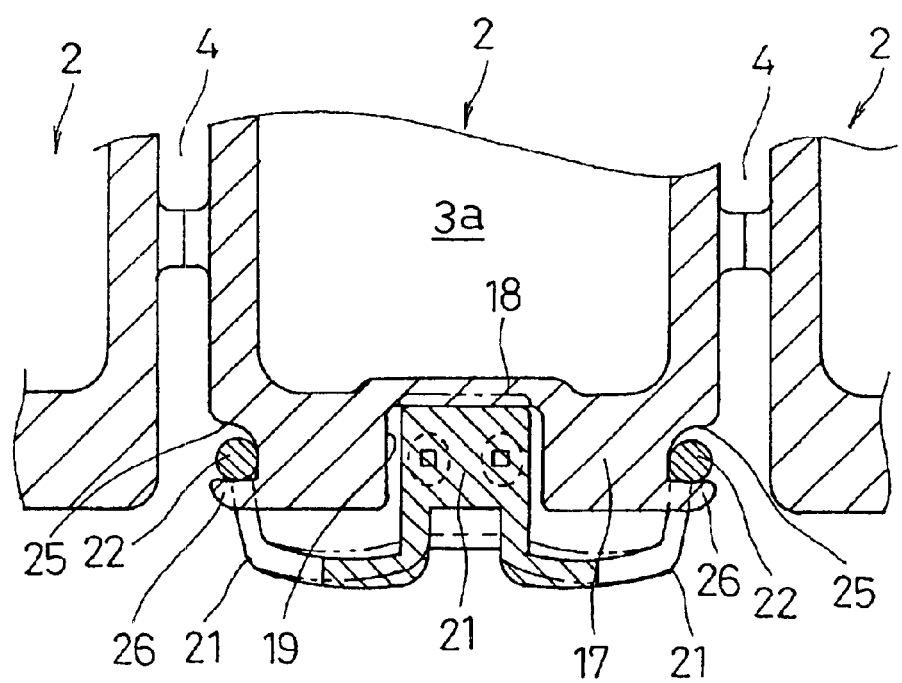
FIG. 3 is a cross-sectional view taken along an arrow III—III in FIG. 2.

Next, the arrangement configuration of the temperature detection sensor 14 will be described in detail with reference to FIGS. 2 to 7. As shown in FIGS. 2 and 3, a sensor placement concave 19 is formed in a bottom wall 17 of an appropriate battery case 3a so as to be separated from a space inside the battery case 3a through a partition wall 18 that is thinner than the bottom wall 17. The temperature detection sensor 14 is placed in the sensor placement concave 19 so as to be pressed against the partition wall 18.

Figure 4A:
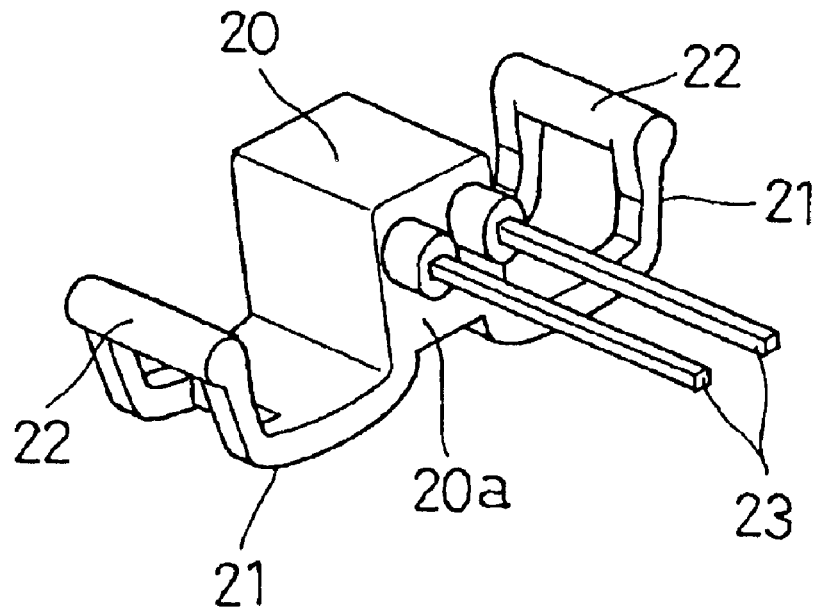
FIGS. 4A and 4B are views showing the temperature detection sensor in the embodiment, where
Figure 4B:
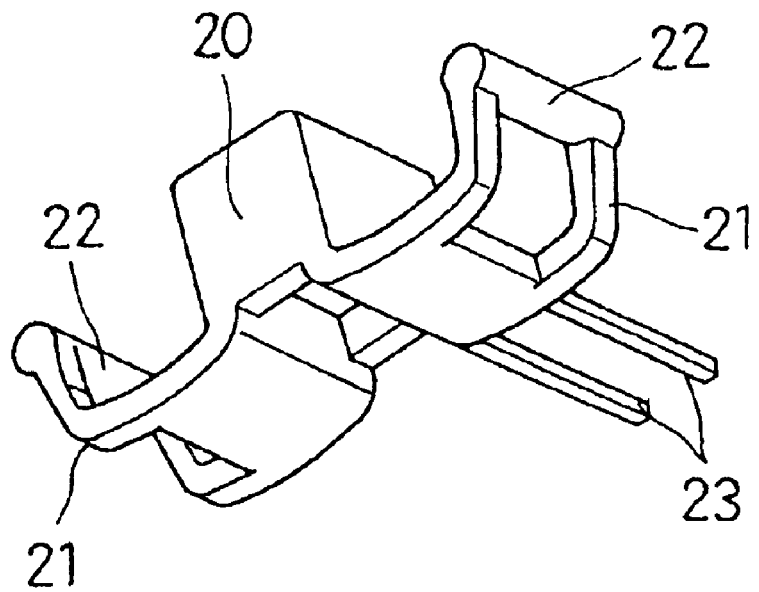

The temperature detection sensor 14 includes a main body 20 having a detection part 14a (see FIG. 2) therein; and elastically deformable attachment arms 21, as shown in FIGS. 4A and 4B. The attachment arms 21 are upwardly extended from both sides of the lower end of the main body 20. Each of the attachment arms 21 has an engaging portion 22 on its tip. The main body 20 is almost entirely placed within the sensor placement concave 19, as shown in FIGS. 2 and 3. A pair of terminals 23 are provided on one end face 20a of the main body 20 so as to protrude therefrom. A harness 24 for obtaining a detection signal is connected to the terminals 23.

Figure 5:
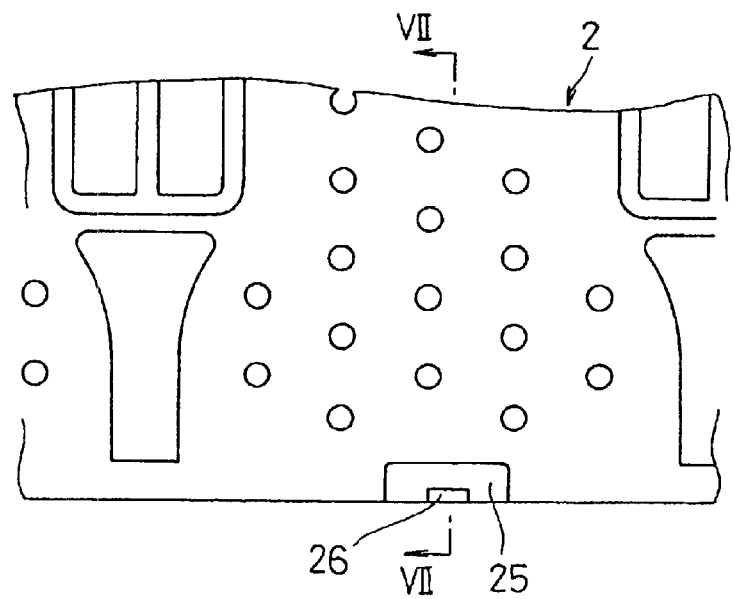
FIG. 5 is a front view of a portion of a battery case where the temperature detection sensor is placed, according to the embodiment.
Figure 6:
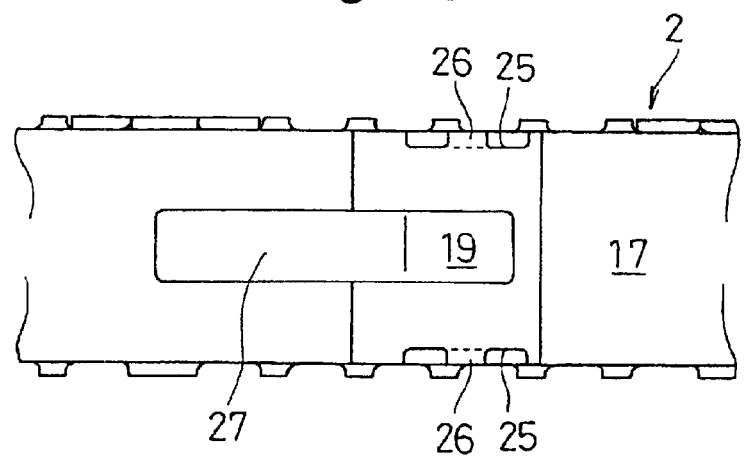
FIG. 6 is a bottom plan view of FIG. 5.
Figure 7:
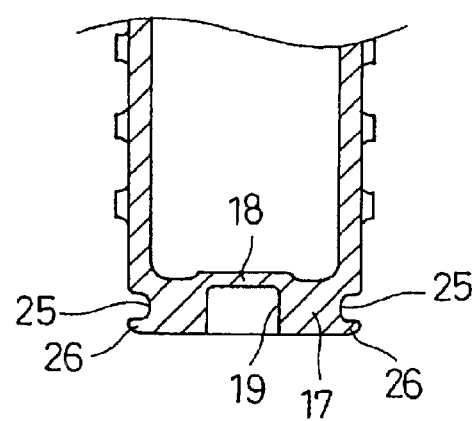
FIG. 7 is a cross-sectional view taken along an arrow VII—VII in FIG. 5.
Figure 8:
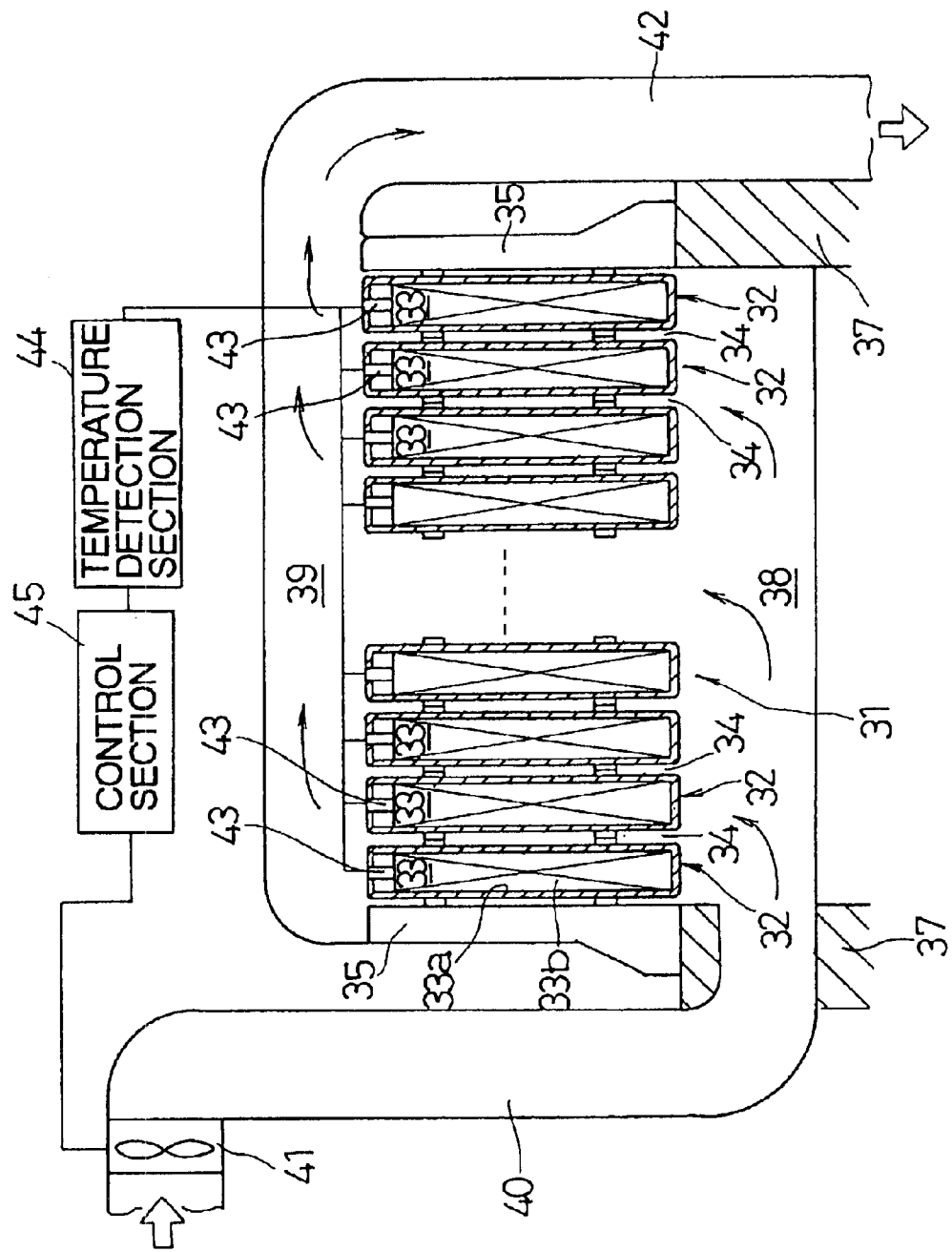
FIG. 8 is a schematic view showing the configuration of a conventional cooling device for a battery pack.
Figure 9:
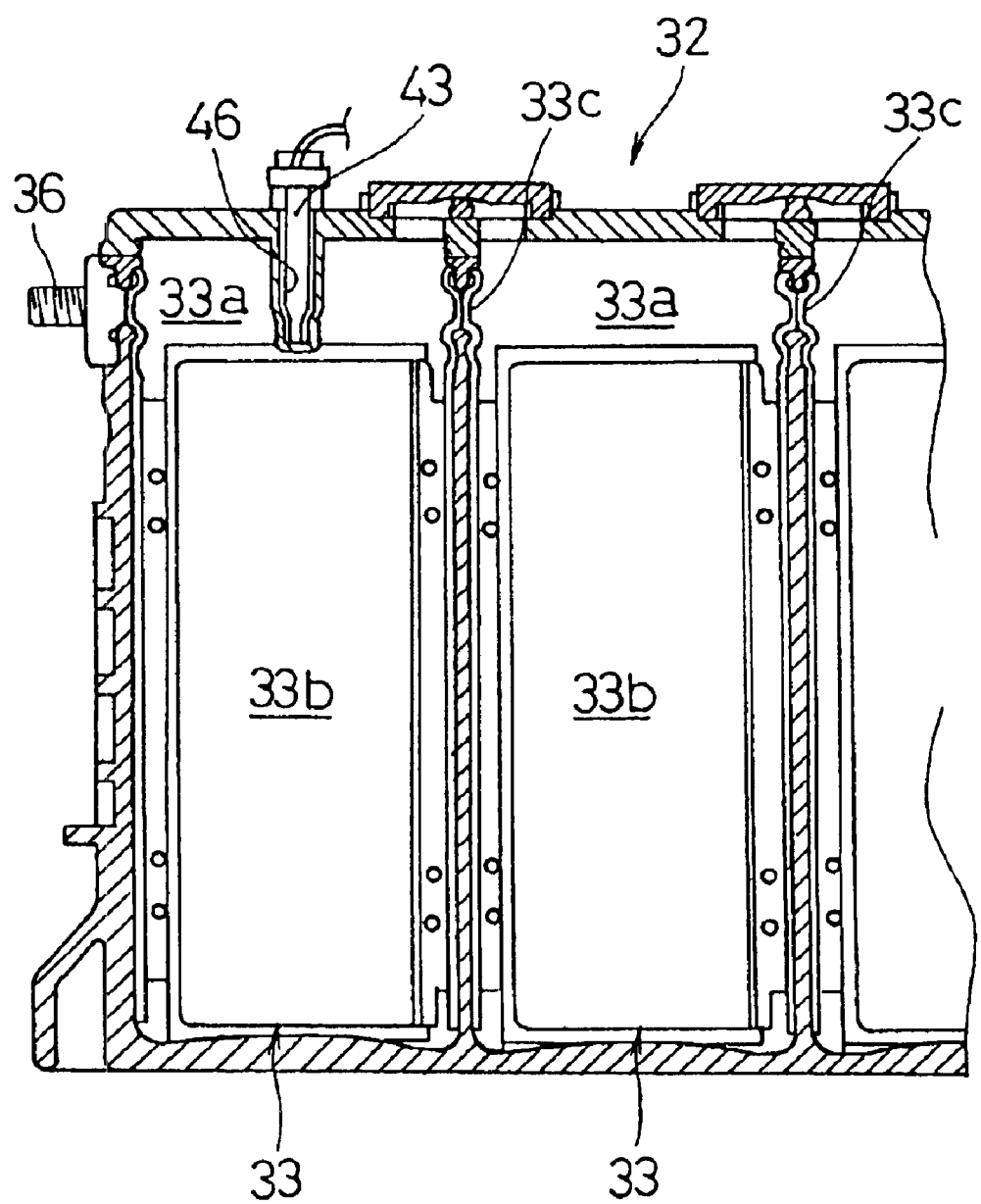
FIG. 9 is a front view including a partial longitudinal section of a rechargeable battery in the conventional battery pack.

On the bottom of the battery case 3a where the temperature detection sensor 14 is placed, the sensor placement concave 19 is formed in the bottom wall 17 as shown in FIGS. 5 to 7. At the same time, side face concaves 25 are formed on both side faces at their lower portions. At the central portions of the lower ends of the side face concaves 25, engaging protruding portions 26 for engaging with the engaging portions 22 of the attachment arms 21 are provided so as not to protrude beyond both side faces of the battery case 3a. The attachment arms 21 and the engaging portions 22 on their tips are constituted so as not to protrude beyond both side faces of the battery case 3a while the engaging protruding portions 26 are engaging with the engaging portions 22. In the state where the engaging protruding portions 26 engage with the engaging portions 22, the attachment arms 21 are elastically deformed from a state indicated with a virtual line in FIG. 3 to a solid line. The reaction force generated by the elastic deformation presses the main body 20 against the partition wall 18.

On the bottom wall 17 of the battery case 3a, a leading groove 27 for externally leading the harness 24 is formed so as to be continuous from one end of the sensor placement concave 19.

According to the configuration of this embodiment, since cooling air is sent in a downflow system, that is, is downwardly sent from above the battery pack 1 through the ventilation spaces 4 between the rechargeable batteries 2, the upper portion of each of the rechargeable batteries 2 where heat generating portions concentrate is first cooled to perform the effective cooling. As a result, the battery pack 1 is effectively cooled as a whole, and a variation in temperature between the upper portion and the lower portion of the battery pack 1 is restrained.

Moreover, the lower end of the rechargeable battery 2 has the highest temperature as a result of cooling in a downflow system. However, a temperature of the lower end is detected with the temperature detection sensor 14 to control the blower fan 10 by the control section 16, so that the entire battery pack 1 is controlled to have a temperature within an appropriate range. Thereby, a decrease in a battery output, charging/discharging efficiency, and battery service life is prevented.

In addition, the sensor placement concave 19, which is separated from the space inside the battery case 3a through the thin partition wall 18, is provided in the bottom wall 17 of the battery case 3a and the temperature detection sensor 14 is placed in the sensor placement concave 19 so as to be pressed against the partition wall 18. Consequently, in a case where the battery pack 1 is to be cooled in a downflow system, a temperature of the lower end of the rechargeable battery 2 that has the highest temperature is detected with good accuracy and good response while maintaining the sealed state of the battery case 3a by the provision of the partition wall 18.

Furthermore, since the main body 20 having the detection portion 14a therein is almost entirely placed within the sensor placement concave 19, the temperature detection sensor 14 is scarcely thermally affected by cooling air. Thus, a temperature is detected with higher accuracy.

Moreover, the temperature detection sensor 14 is constituted by the main body 20 and the elastically deformable attachment arms 21 having the engaging portions 22 on their tips. For attachment of the temperature detection sensor 14, the engaging portions 22 are engaged with the engaging protruding portions 26 provided on the lower ends of the side face concaves 25 formed on both side faces of the battery case at their lower portions with such a structure, since the temperature detection sensor 14 can be easily attached to and removed from the sensor placement concave 19, good operability is obtained at the time of attaching the temperature detection sensor 14 or at the time of maintenance such as replacement of the rechargeable battery. Furthermore, the main body 20 is pressed against the partition wall 18 due to elastic deformation of the attachment arms 21, thereby achieving the temperature detection with good accuracy.

Furthermore, since the engaging protruding portions 26 are provided on the lower ends of the side face concaves 25 so as not to protrude beyond both side faces of the battery case, and the engaging portions 22 of the attachment arms 21 are constituted to fit into the side face concaves 25, there is no portion protruding beyond the side faces of the battery case with the temperature detection sensor 14 being attached. Thus, cooling air flowing through the ventilation spaces 4 is not hampered to allow high cooling capacity to be maintained.

According to the cooling device for the battery pack of the present invention, the upper part of each of the rechargeable batteries where heat generating portions concentrate is first cooled. As a result, the battery pack is efficiently cooled as a whole, and a variation in temperature between the upper part and the lower part of the battery pack is restrained. Moreover, since a temperature of the lower end of the rechargeable battery, which has the highest temperature as a result of cooling in a downflow system, is detected with the temperature detection sensor so as to control the blower device, a temperature of the entire battery pack is controlled to be within an appropriate range to prevent a decrease in a battery output, charging/discharging efficiency, and battery service life. Furthermore, the structure of the air duct in the cooling device is simplified, thereby reducing cost and space.

Furthermore, according to the rechargeable battery of the present invention, in a case where the battery pack is cooled in a downflow system, a temperature of the lower end of the rechargeable battery, which has the highest temperature, is detected. In addition, since the temperature detection sensor is in contact with the thin partition wall by being pressed against it, a temperature inside the battery case is detected with good accuracy and good response.

Although the present invention has been fully described in connection with the preferred embodiment thereof, it is to be noted that various changes and modifications apparent to those skilled in the art are to be understood as included within the scope of the present invention as defined by the appended claims unless they depart therefrom.

What is claimed is:

1. A cooling device for a battery pack including a plurality of prismatic rechargeable batteries arranged in parallel with a ventilation space being provided therebetween, the cooling device comprising:
   a blower device that sends cooling air from above the battery pack downwardly through the ventilation space to a lower end of the batteries; and
   a control device that controls the blower device in accordance with a temperature detected by a temperature detection sensor attached to the lower end of at least one of the rechargeable batteries.

2. A rechargeable battery comprising:
   a sealed prismatic battery case that accommodates an electricity generating element, the battery case having a sensor placement depression on a bottom wall of the battery case through a partition wall thinner than the bottom wall so as to be separated from a space inside the battery case; and a temperature detection sensor provided in the sensor placement concave and pressed against the partition wall.

3. The rechargeable battery according to claim 2, wherein the temperature detection sensor includes a main body having a detection portion, the main body being substantially fully received within the sensor placement depression.

4. The rechargeable battery according to claim 3, wherein the temperature detection sensor comprises the main body and elastically deformable attachment arms extending from both sides of the main body, the attachment arms having engaging portions at their tips; and engaging protruding portions that extend from the battery case and that engage with the engaging portions of the attachment arms, the engaging protruding portions being provided on a bottom of the battery case on two sides so that the main body is pressed against the partition wall with the engaging portions of the attachment arms being engaged with the engaging protruding portions.

5. The rechargeable battery according to claim 4, wherein side face depressions are provided at lower portions on the two sides of the battery case;

the engaging protruding portions are provided at lower ends of the side face depressions so as not to protrude beyond the two sides of the battery case; and the engaging portions of the attachment arms are placed within the side face depressions.

6. A battery system for rechargeable, prismatic batteries of a battery pack, the battery system comprising:

a temperature detection sensor positioned at an end of a battery of a battery pack that is opposite to an end of the battery pack in which a blower device is positioned; and a control device that controls the blower device, in accordance with a temperature detected by the temperature detection sensor, to send air through a ventilation space, the air being directed through the ventilation space from the end of the battery pack in which the blower device is positioned to the end of the battery pack at which the temperature detection sensor is positioned.

7. The battery system according to claim 6, wherein the ventilation space is provided between the batteries.

8. The battery system according to claim 6, wherein the temperature detection sensor further comprises:

a main body including a sensor detecting part; and at least one arm extending from the main body, the at least one arm having a portion that attaches to a battery case.

9. The battery system according to claim 8, the battery system further comprising:

at least one depression positioned on a side of the battery case, the at least one depression being configured to receive the at least one arm of the main body to attach the temperature detection sensor to the battery pack, whereby portions of the arm do not protrude beyond the battery case on the side at which the at least one depression is provided.

10. The battery system according to claim 8, wherein the main body of the temperature detection sensor is pressed against a wall of the battery case that is thinner than an adjacent wall of the battery case, the main body being positioned within the battery case such that the temperature detection sensor is configured to detect temperatures of the battery.

* * * * *